United States Patent
Srinivasaraghavan

(10) Patent No.: US 11,321,610 B2
(45) Date of Patent: May 3, 2022

(54) REHEARSAL NETWORK FOR GENERALIZED LEARNING

(71) Applicant: Verizon Patent and Licensing Inc., Arlington, VA (US)

(72) Inventor: Haripriya Srinivasaraghavan, Plano, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 878 days.

(21) Appl. No.: 16/108,242

(22) Filed: Aug. 22, 2018

(65) Prior Publication Data
US 2020/0065662 A1    Feb. 27, 2020

(51) Int. Cl.
  *G06N 3/08* (2006.01)
  *G06N 3/04* (2006.01)
  *G06F 17/18* (2006.01)
  *G06F 16/78* (2019.01)
  *G06Q 30/02* (2012.01)

(52) U.S. Cl.
  CPC .......... *G06N 3/08* (2013.01); *G06F 16/78* (2019.01); *G06F 17/18* (2013.01); *G06N 3/04* (2013.01); *G06Q 30/0282* (2013.01)

(58) Field of Classification Search
  None
  See application file for complete search history.

(56) References Cited

U.S. PATENT DOCUMENTS

| 2015/0170055 A1* | 6/2015 | Beymer .......... G06N 20/00 706/12 |
| 2017/0032246 A1* | 2/2017 | Knittel .......... G06N 3/084 |

OTHER PUBLICATIONS

Vartak et al., A Meta-Learning Perspective on Cold-Start Recommendations for Items, NIPS'17: Proceedings of the 31st International Conference on Neural Information Processing Systems, p. 6907-6917, Dec. 4, 2017, URL: https://papers.nips.cc/paper/2017/file/51e6d6e679953c6311757004d8cbbba9-Paper.pdf (Year: 2017).*

* cited by examiner

*Primary Examiner* — Steven S Kim
*Assistant Examiner* — Jason B Fenstermacher

(57) ABSTRACT

A method, a device, and a non-transitory storage medium are described in which a rehearsal network service is provided that enables generalized learning for all types of input patterns ranging from one-shot inputs to a large set of inputs. The rehearsal network service includes using biological memory indicator data relating to a user and the input data. The rehearsal network service includes calculating a normalized effective salience for each input data, and generating a new set of input data in which the inclusion of input data is proportional to its normalization effective salience. The rehearsal network service further includes augmenting the new set of input data using perturbation values. The rehearsal network service provides the new set of input data to a learning network, such as a neural network or a deep learning network that can learn the user's taste or preference.

20 Claims, 19 Drawing Sheets

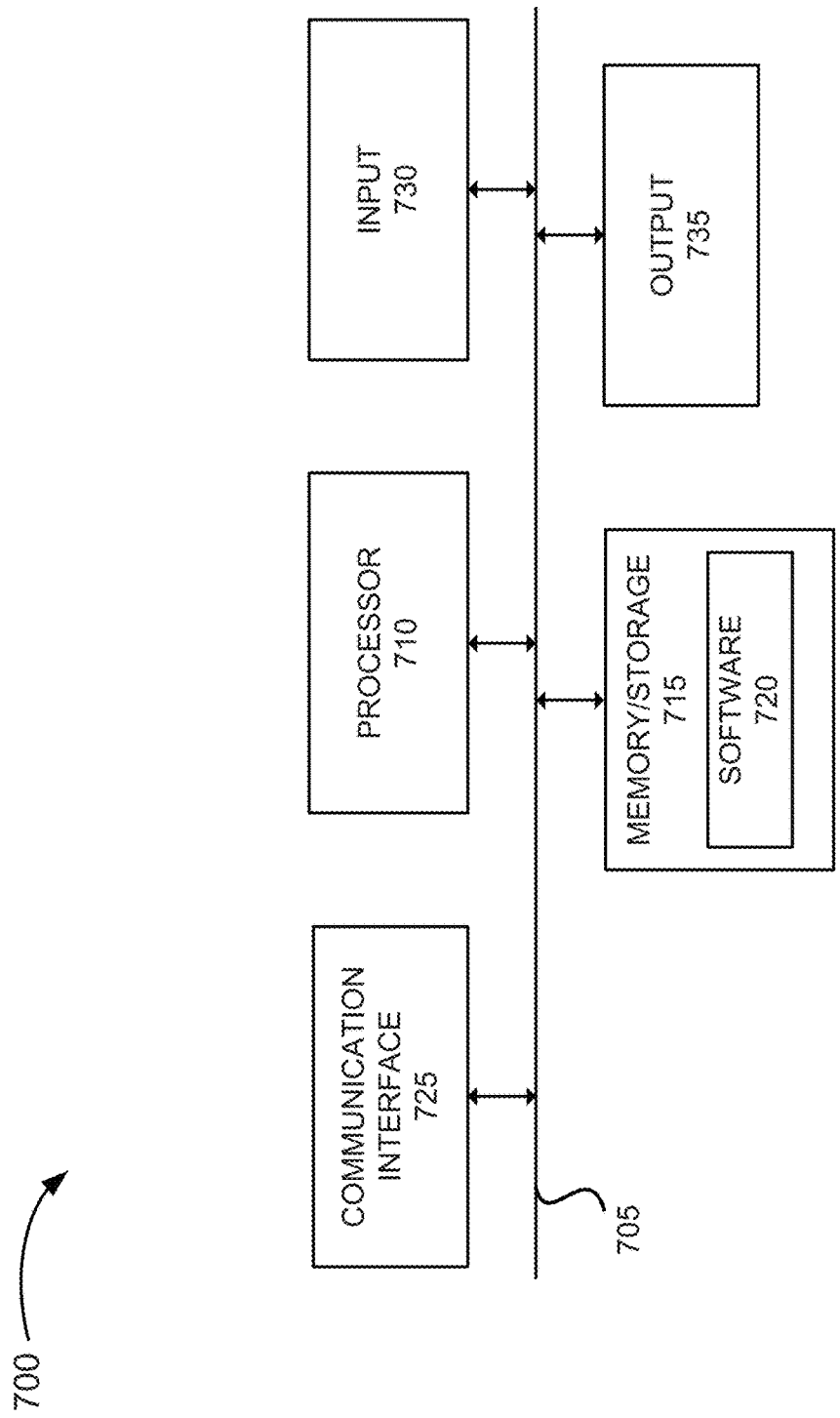

| k | X'(k) | Class |
|---|---|---|
| 0 | X-10 | 1 |
| 1 | X-16 | 3 |
| 2 | X-18 | 2 |
| 3 | X-1 | 1 |
| 4 | X-16 | 3 |
| 5 | X-23 | 2 |
| 6 | X-16 | 3 |

| k | X'(k) | Class |
|---|---|---|
| 7 | X-7 | 2 |
| 8 | X-16 | 3 |
| 9 | X-2 | 2 |
| 10 | X-16 | 3 |
| 11 | X-1 | 1 |
| 12 | X-27 | 1 |
| 13 | X-16 | 3 |

| k | X'(k) | Class |
|---|---|---|
| 14 | X-12 | 1 |
| 15 | X-30 | 2 |
| 16 | X-13 | 2 |
| 17 | X-16 | 3 |
| 18 | X-16 | 3 |
| 19 | X-9 | 1 |
| 20 | X-5 | 2 |

| k | X'(k) | Class |
|---|---|---|
| 21 | X-11 | 2 |
| 22 | X-16 | 3 |
| 23 | X-45 | 2 |
| 998 | X-11 | 2 |
| 999 | X-16 | 3 |
| 1000 | X-16 | 3 |

REHEARSAL NETWORK FOR GENERALIZED LEARNING

BACKGROUND

Traditional neural networks and deep learning networks can learn user taste and preferences, but they need a large set of examples from which to learn.

BRIEF DESCRIPTION OF THE DRAWINGS

FIG. 7 is a diagram illustrating exemplary components of a device that may correspond to one or more of the devices illustrated and described herein;

DETAILED DESCRIPTION OF PREFERRED EMBODIMENTS

Figure 1A:
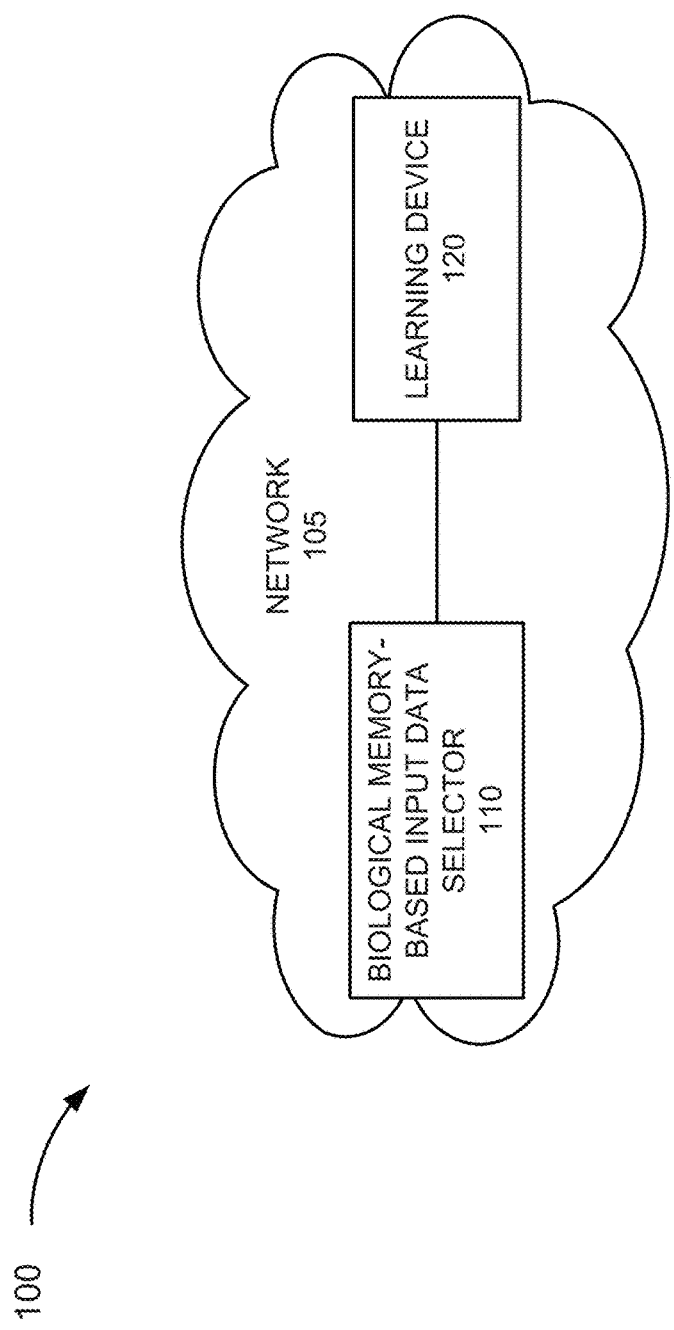
FIG. 1A is a diagram illustrating an exemplary environment in which exemplary embodiments of a rehearsal network service may be implemented.

The following detailed description refers to the accompanying drawings. The same reference numbers in different drawings may identify the same or similar elements. Also, the following detailed description does not limit the invention.

It is difficult for current neural networks and deep learning networks (referred to hereinafter as simply "neural networks") to learn from very few examples, such as one-shot learning. Traditional collaborative filtering has been used to address this problem, but such an approach groups users together and does not account for individual user taste and preference variations. A problem is to be able to enable generalized learning for all types of input patterns ranging from very few examples one-shot learning) to many examples (e.g., repetitive learning).

According to exemplary embodiments, a rehearsal network service is provided. According to an exemplary embodiment, the rehearsal network service is provided by a network device. According to an exemplary embodiment, the network device includes logic that uses biological memory indicators associated with input data pertaining to one or multiple users as a basis for selecting input data to be used to train a learning network and enable generalized learning. According to an exemplary embodiment, the biological memory indicators include saliency, valence, and timestamp values.

According to an exemplary embodiment, the network device calculates novelty values for the input data. According to an exemplary embodiment, as described herein, the network device includes logic that calculates effective salience values for the input data based on the novelty values, and recency and primacy functions. According to an exemplary embodiment, as described herein, the network device calculates normalized effective salience values for the input data based on the calculated effective salience values, and uses the normalized effective salience values to define a probability mass function. According to an exemplary embodiment, the network device includes logic that calculates probability cumulative distribution function values for the input data based on the normalized effective salience values of the probability mass function and a cumulative distribution function.

According to an exemplary embodiment, the network device includes logic that generates a new set of input data based on the statistical sampling of the input data. According to an exemplary embodiment, as described herein, the network device performs the statistical sampling of the input data based on a cumulative distribution function specifically defined such that the inclusion of input data and the number of occurrences in the generation of the new set of input data is proportional to the normalized effective salience value of the input data. For example, an instance of input data that has a higher normalized effective salience value than another instance of input data will occur more times in the new set of input data. In this way, the network device generates the new set of input data, which is different from the original input data, such that the occurrence of each input data is proportional to its normalized effective salience value. As an example, a single input that has a very high salience may be rehearsed multiple times for training purposes and allows the learning network to learn the one-shot input as if the learning network may learn highly recurring input patterns.

According to an exemplary embodiment, the network device includes logic that modifies a random dimension of the input data based on a random value. In this way, the new set of input data, which may include a minimal set of examples, may be expanded to a larger set of examples by way of the modification of the values associated with the random dimension.

According to an exemplary embodiment, the rehearsal network service generates input data for a learning network. According to an exemplary implementation, the input data is used to train the learning network. In turn, based on such training, the learning network is able to learn an individual user's taste or preferences or a group of users' tastes or preferences based on one-time inputs or a series of inputs that each includes small or large sets of input data. According to other exemplary implementations, the input data is used to predict or recommend for the individual user or a group of users.

According to various exemplary embodiments, the rehearsal network service has a variety of applications including generating training data to be used by the learning network to learn user taste/preference relating to content selection (e.g., movies, television shows, etc.) or other items, as well as generating input data to be used by the learning network to recommend content or other items. Additionally, the rehearsal network service may be used in other applications including computer vision (e.g., object detection, object tracking, event detection, scene reconstruction, etc.).

Given the expansive nature of available contents for users to consume, service providers are confronted with various technological problems. For example, the search space within which users may search and discover contents of interest may be many times more massive than the contents itself when metadata of the contents is used as criteria to search and discover contents. As a consequence, the amount of time to search through the metadata, identify contents, limit the number of contents that may be of interest to the user, and present a search result within a time period that is tolerable to the user can be problematic.

In view of the foregoing, the rehearsal network service improves the learning of a user's taste or preference by a learning network based on the generation of a new set of input data that enables generalized learning regardless of the input patterns (e.g., one-shot inputs, reoccurring inputs) associated with original input data. As described, the new set of input data is generated based on the biological memory indicator data correlated to the original input data in which normalized effective salience is used as a basis to determine the frequency in which input data occurs in the new set, such that the learning network can rehearse input data a certain number of times in accordance with its saliency. Thus, the resource network service may reduce the time and, in turn the consumption of network resources processor, memory, communication links, etc.) allocated to learn the user's taste or preference. Also, since the highly salient input is rehearsed multiple times, and when combined with data augmentation techniques, the performance of the learning network with respect to predicting the user preferences increases multifold for input data and situations that are highly salient but are one of a kind.

Although, according to various exemplary embodiments, the rehearsal network service is described in relation to learning a user's taste or preference, according to other exemplary embodiments, the rehearsal network service may be applied to other applications (e.g., computer vision, etc.) that may or may not involve learning the user's taste or preference, but more generally the learning of a category, a class, or another type of segmentation in relation to a particular field of application. Such generalized learning is supported based on the generation of input data that accounts for various characteristics of the source input data (e.g., one-shot input data, amount of input data, saliency of the input data, etc.), as well as the impediments associated with learning devices (e.g., catastrophic forgetting, insufficient number of examples to learn, etc.), as described herein.

FIG. 1A is a diagram illustrating an exemplary environment 100 in which an exemplary embodiment of the rehearsal network service may be implemented. As illustrated, environment 100 includes a network 105. Network 105 includes a biological memory-based training and recommendation input data selector (BMIDS) 110 and a learning device 120.

The number and arrangement of networks and network devices are exemplary. According to other embodiments, environment 100 may include additional network devices, fewer network devices, and/or differently arranged network devices, than those illustrated in FIG. 1A. For example, a single device in FIG. 1A may be implemented as multiple devices and/or multiple devices may be implemented as a single device.

A network device, a network element, or a network function (referred to herein simply as a network device) may be implemented according to one or multiple network architectures (e.g., a client device, a server device, a peer device, a proxy device, a cloud device, a virtualized function, etc). A network device may be implemented according to various computing architectures, such as a centralized computing architecture, a distributed computing architecture, a cloud computing architecture (e.g., an elastic cloud, a private cloud, a public cloud, etc.), or a fog computing architecture.

Environment 100 includes communication links between the network devices. Environment 100 may be implemented to include wired, optical, and/or wireless communication links among the network devices. A communicative connection via a communication link may be direct or indirect. For example, an indirect communicative connection may involve an intermediary device and/or an intermediary network not illustrated in FIG. 1A. A direct communicative connection may not involve an intermediary device and/or an intermediary network. The number and the arrangement of communication links illustrated in environment 100 are exemplary.

Network 105 includes a network that provides access to and use of a rehearsal network service. Generally, network 105 may be implemented as a satellite-based network, a terrestrial-based network, or a combination thereof. Also, network 105 may be implemented as a wired network, a wireless network, and/or an optical network. According to various exemplary implementations, network 105 may include an access network, a core network, a portion of the Internet, a portion of the Web, an Internet Protocol Multimedia Subsystem (IMS) network, a Rich Communication Service (RCS) network, a cloud network, a packet-switched network, a data center, a private network, a public network, a wide area network (WAN), a metropolitan area network (MAN), or another type of network that is configured to host an application and/or a service, such as the rehearsal network service and a machine learning service, as described herein.

BMIDS 110 includes a network device that includes logic that provides a rehearsal network service. As described herein, BMIDS 110 includes logic that uses biological memory indicators associated with input data pertaining to one or multiple users as a basis to select input data to be used to train learning device 120 and enable generalized learning of user taste or preference. BMIDS 110 further includes logic that uses biological memory indicators associated with input data pertaining to one or multiple users as a basis to select input data to be used by learning device 120 to make recommendations, which align the user's learned taste or preference, with respect to a large set of available items. According to one exemplary embodiment, the input data relates to contents. For example, as described herein, a multi-dimensional instance of input data X may represent an audio (e.g., music, audio book, etc.), a visual (e.g., videos, books, pictures, etc.), or an audio and visual type of content (e.g., music videos, movies, television shows, podcasts, webcasts, multimedia, etc.) that include various types of metadata having various types of values (e.g., numerical, strings, etc.). According to other exemplary embodiments, the input data X relates to other forms of items and applications (e.g., computer vision, shopping, etc.). BMIDS 110 is described further below.

Learning device 120 includes a network device that includes logic of a neural network (also known as an artificial neural network (ANN)) that provides a machine learning service. The machine learning service may include supervised learning or unsupervised learning. Learning device 120 may include logic that uses associative mapping, regularity detection, or a weighting system (e.g., fixed, adaptive, etc.). According to various exemplary embodiments, BMIDS 110 and learning device 120 may be implemented as a single network device or multiple and separate network devices.

According to exemplary embodiments, learning device 120 uses the rehearsal service to obtain input data X for training purposes as a basis to provide a generalized learning service in relation to a user's taste or preferences. For example, learning device 120 includes logic that enables learning device 120 to learn the user's taste or preference regardless of the nature of source input data (e.g., amount of source input data, one-shot input data, number of prime examples, etc.) that pertains to the user (e.g., metadata of contents consumed by the user, ratings and review information pertaining to the consumed contents, etc.).

Existing learning devices (e.g., deep learning networks, neural networks, artificial intelligence networks, etc.) are subject to catastrophic forgetting (also known as catastrophic interference) in which the learning device abruptly forgets previously learned information upon learning new information. As a result, learning devices can suffer from evaluation and inference performance issues, particularly with respect to one-shot input examples that are rare but very salient, as well as accuracy in learning a classification or another learning goal (e.g., a user's taste or preference, etc.). Consequently, the re-learning or lack of proper learning can be detrimental from a network resource utilization standpoint as well as quality of service standpoint.

In contrast, the rehearsal network service identifies the one-shot input example, generates the same one-shot example repetitively, as well as perturbations of the one-shot input example, and provides the generated input data to learning device 120. As a result, with respect to learning device 120, the occurrence of catastrophic forgetting may be minimized or prevented, and the evaluation performance and the inference performance may be enhanced due to the improved learning and recall of learning device 120. Additionally, learning device 120 may improve its accuracy of learning one-shot input examples by way of the repetition and perturbations of input data provided by the rehearsal network service, as well as improve the evaluation and inference performance of learning device 120. For example, learning device 120 may improve generating recommendations based on learned user's taste or preferences.

Figure 1B:
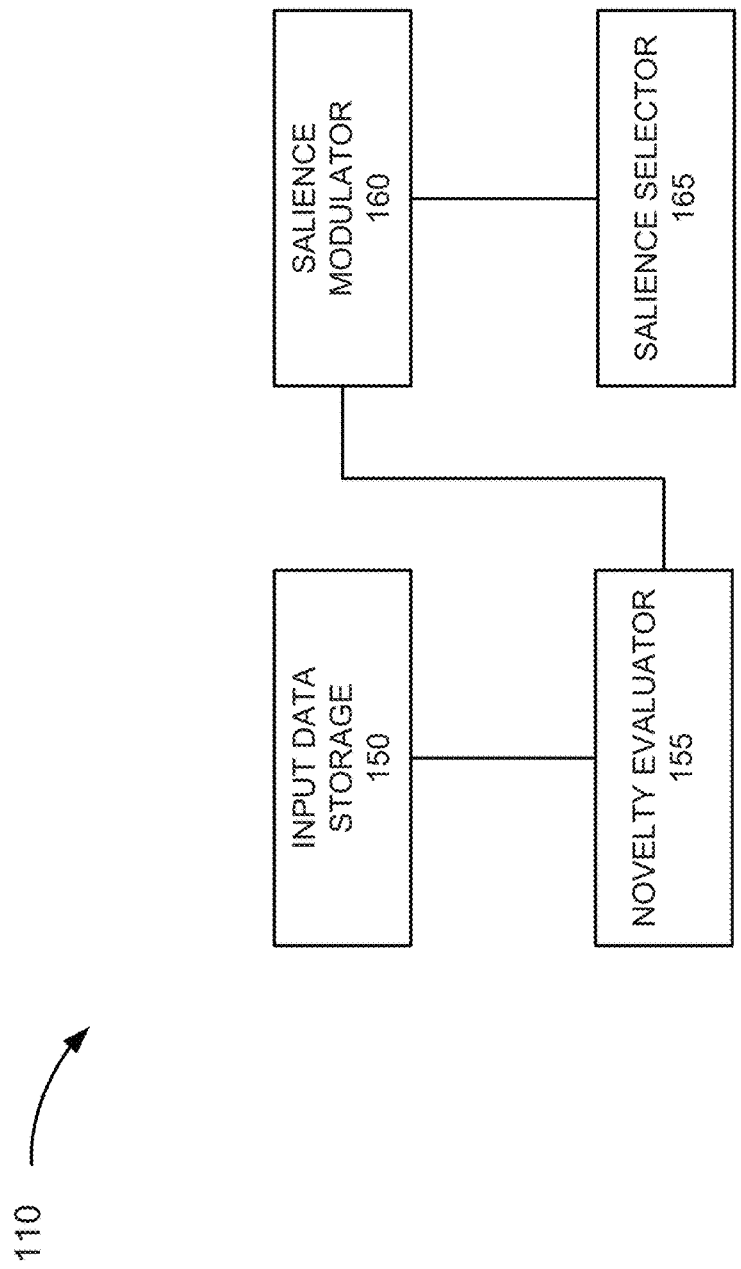
FIG. 1B is a diagram illustrating exemplary components of a biological memory-based input data selector.

FIG. 1B is a diagram illustrating exemplary components of a biological memory-based input data selector. As illustrated, an exemplary embodiment of BMIDS 110 includes an input data storage 150, a novelty evaluator 155, a salience modulator 160, and a salience selector 165.

Input data storage 150 includes logic that ingests and stores input data and biological memory indicator data relating to the input data. According to one exemplary embodiment, the biological memory indicator data may be derived from a content provider service in which contents and metadata (e.g., input data X) are ingested by users and user feedback data is used as a basis to calculate values for salience (s), valence (v), and timestamp (t) data. According to other exemplary embodiments, the biological memory indicator data may be derived from a different service in which other types of items are used and/or selected by users input data X) and user feedback data is used as a basis to calculate salience, valence, and timestamp data values.

Input data storage 150 may include a database management system (DBMS). The DBMS may be implemented using conventional, well-known, or commercially available relational or No Structured Query Language (NoSQL) software/packages e.g., Microsoft SQL, Oracle Database, Cassandra, MongoDB, etc.). Alternatively, input data storage 150 may include another type of data management system. Input data storage 150 may include logic that performs other storage-related functions, such as, formatting data, adding data, deleting data, maintaining data quality, providing data access, providing data extraction, etc. for a database or another type of data structure. Input data and biological memory indicator data stored by input data storage 150 is described further below in relation to FIG. 2.

Figure 2:
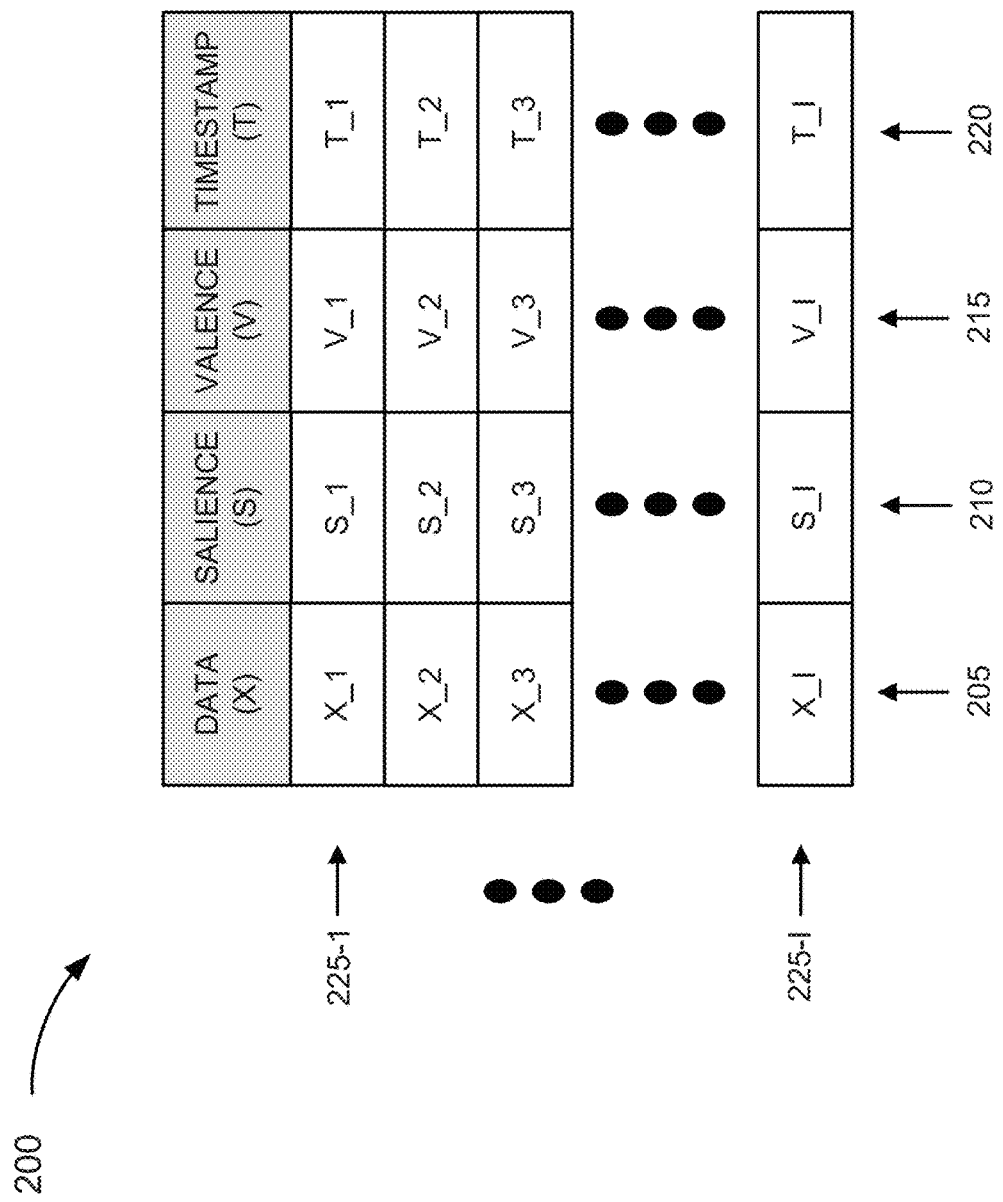
FIG. 2 is a diagram illustrating an exemplary data structure that is used to store an exemplary embodiment of input data and biological memory indicator data.

FIG. 2 is a diagram illustrating an exemplary data structure that is used to store an exemplary embodiment of input data and biological memory indicator data. As illustrated, a table 200 may include a data field 205, a salience field 210, a valence field 215, and a timestamp field 220. As further illustrated, table 200 includes records 225-1 through 225-I in which each record 225 includes a grouping of fields 205, 210, 215, and 220 that are correlated. The input data and biological memory indicator data are illustrated in tabular form merely for the sake of description. In this regard, the input data and biological memory indicator data may be stored in a data structure different from a table. The values described in relation to the input data and the biological memory indicator data are purely exemplary.

Data field 205 stores data indicating the object or item of interest from which a user's taste or preference is to be learned or relating to a recommendation to the user. The object or item of interest data may be multi-dimensional in terms of attributes and possible values of such attributes. By way of example, in instance of input data X, when such input data is content, the attributes of the content may correspond to the metadata. The metadata may include, for example, data indicating a title of a content, a genre and/or a sub-genre of the content, cast and crew information, storyline information (e.g., plot summary, synopsis, tagline, etc.), a movie rating or a television rating (e.g., R, PG-13, TV 14, etc.), a date of release, a language, a runtime, a video format (e.g., 4K, HD, 3D, etc.), an audio format (e.g., stereo, Dolby Surround 7.1, etc.), filming location information, company credit information (e.g., production company, distributor, etc. award information (e.g., best picture, best actor, etc.), and/or unique identifier that identifies the content. The metadata may also include rating and review information, as described herein. For example, the rating and review information may relate to the user of a content service whose taste or preference is to be learned, a user of the content service other than the user, and/or a third party (e.g., a critic, etc.). According to such examples, each type of metadata (e.g., title, genre, etc.) has a value among a multitude of possible values that may be numerical, string, and so forth.

Salience field 210 stores data that indicates a measure of a state or quality by which the instance of input data X stands out from other instances of input data X relative to a user or multiple users. According to an exemplary implementation, the measure of saliency is represented by a range between 0 through 1 in which 0 represents no saliency, 1 represents the highest saliency, and any number between 0 and 1 represents its corresponding measure of saliency.

Valence field 215 stores data that indicates a measure of emotional response relative to the user or multiple users regarding the instance of input data X According to an exemplary implementation, the measure of valence is represented by a range between −1 (e.g., strongly negative) to 1 (e.g., strongly positive), and any number between −1 and 1 represents its corresponding measure of emotional response.

Timestamp field 220 stores data that indicates a time in which the input data X was ingested by the user or multiple users, or considered (e.g., interacted with) but not ingested. For example, timestamp field 220 stores date and time information.

According to other exemplary implementations, table 200 may store additional and/or different instances of biological memory indicator data, as described herein.

Referring back to FIG. 1B, novelty evaluator 155 includes logic that detects and measures novelty relative to input data X For example, novelty evaluator 155 detects and measures newness or not resembling something formerly known or used relative to the input data X. Novelty detection is also known as anomaly/outlier detection. According to various exemplary embodiments, novelty evaluator 155 may include a one-class classifier algorithm, use a distance-based model, such as nearest-neighbor or cluster analysis, or other types of approaches or methods, such as probabilistic density estimation, such as probability density function (PDF)), reconstruction-based (e.g., training a regression model), and information-theoretic techniques (e.g., measurement based on entropy, Kolmogorov complexity, etc.).

Figure 3:
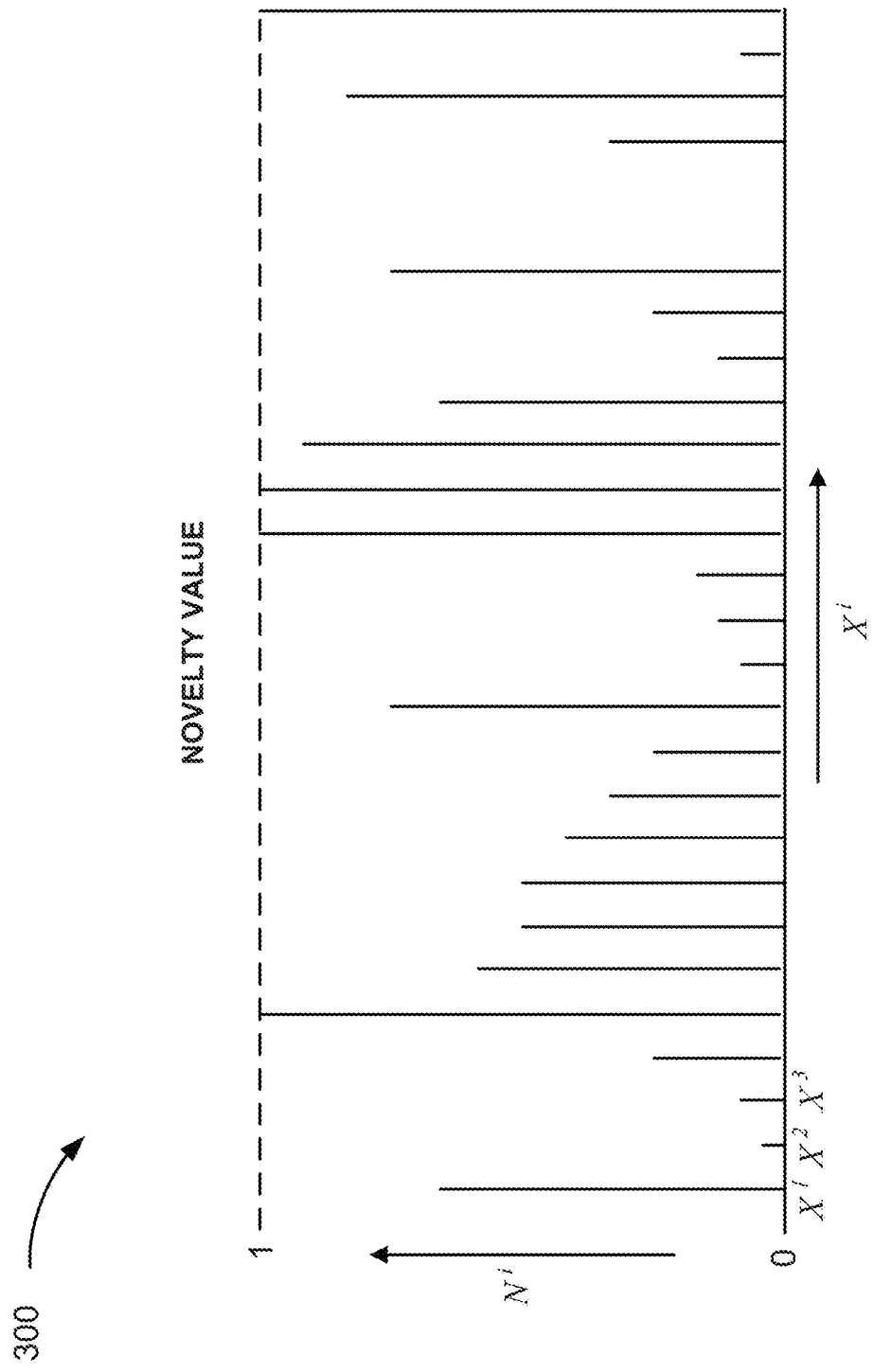
FIG. 3 is a diagram illustrating an exemplary graph that shows exemplary novelty values relative to input data.

According to an exemplary embodiment, novelty evaluator 155 generates and assigns a novelty value for each input data X based on the novelty detection logic applied to the input data X. According to an exemplary implementation, the novelty value has a numerical value that ranges between 0 and 1, in which 0 represents the lowest novelty value, 1 represents the highest novelty score, and any other numerical value between 0 and 1 represents the degree of novelty 0.5, 0.78, etc.). For example, as illustrated in exemplary graph of FIG. 3, each instance of input data $X^i$ is assigned a novelty value $N^i$ between 0 and 1. According to other exemplary implementations, novelty evaluator 155 may generate and assign a novelty score using a numerical range and possible values different from 0 to 1. In the context of input data X being content and metadata (e.g., movies, television shows, music, genre, director, program summary, etc.), novelty evaluator 155 detects and measures the newness of the content based on the metadata associated with the content relative to previously ingested content associated with the user or a group of users. For example, the novelty detection logic may calculate the novelty value based on a comparison between historical data indicating contents associated metadata) viewed by the user and the input data.

Figure 4:
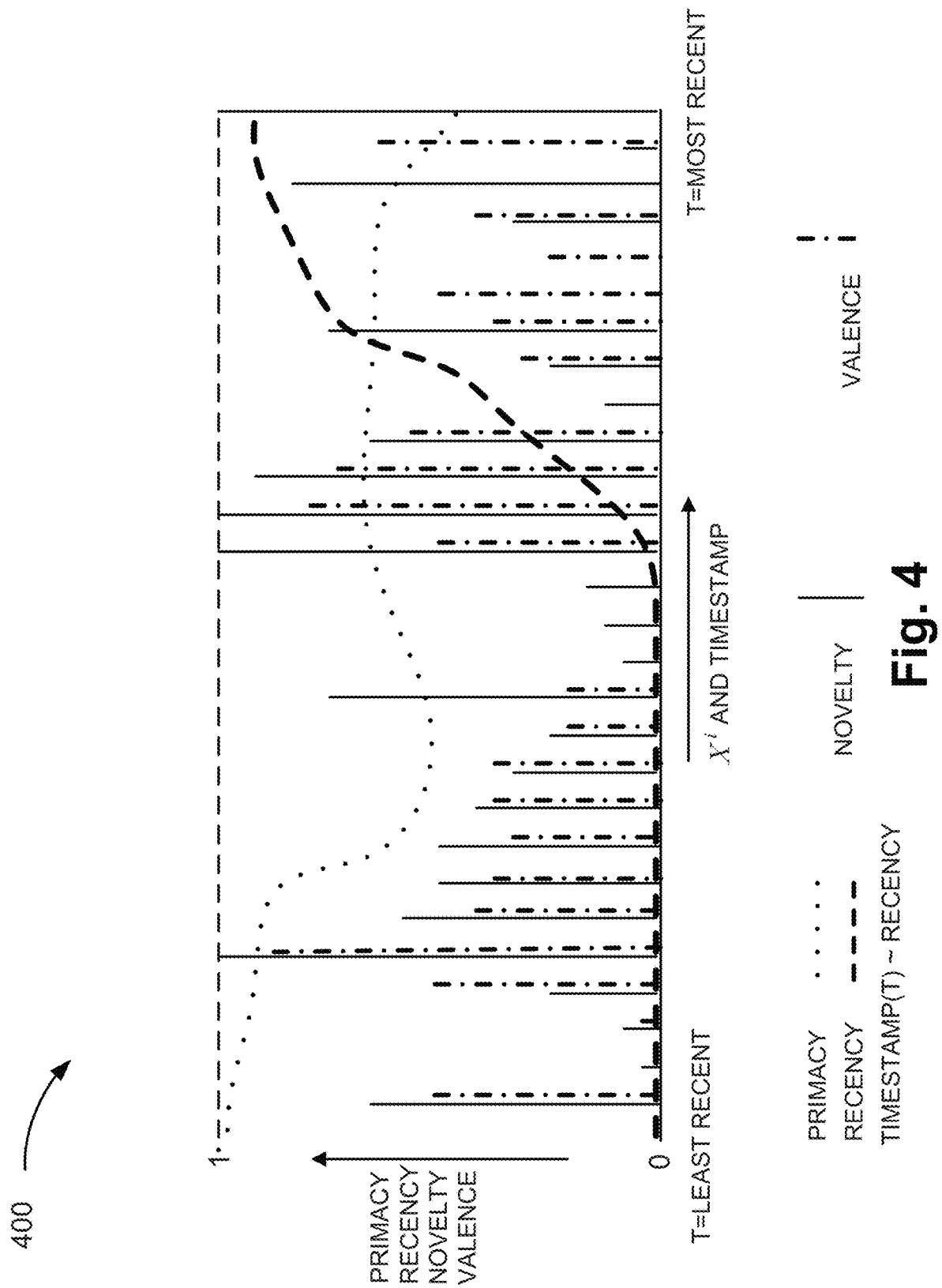
FIG. 4 is a diagram illustrating another exemplary graph that shows exemplary primacy, recency, novelty, and valence values relative to input data.

Salience modulator 160 includes logic that calculates an effective salience (s') for each instance of input data X based on salience value (s), novelty value (n), primacy function (p), and recency function (r). According to an exemplary embodiment, the effective salience value (s') for each instance of input data X is calculated based on the following exemplary expressions:

$$G = p * r \quad (1)$$

$$S' = G(n \times s) \quad (2),$$

in which G is a function that is created by convolving primacy function (p) and recency function (r) (i.e., p*r), as provided by expression (1). In expression (2), a multiplication of salience value (s) and novelty value (n) are used as arguments for the G function, as provided by expression (2), which in turn yields the effective salience value (s'). As a result, the effective salience value (s') is calculated based on the effects of recency, primacy, and novelty. As such, in the context of input data being content, the effective saliency value indicates not only what a user may have thought about a particular content, at the time a rating and/or a review was given or the content was consumed by the user (e.g., watched, viewed, listened to, etc.), but also how the user's salience has changed since that time in view of the primacy and recency effects that occur as time progresses from such consumption. According to an exemplary implementation, the effective salience value (s') may have a value between 0 and 1. According to other exemplary implementations, the effective salience value (s') may have a value between a range different from 0 to 1, FIG. 4 is a diagram illustrating another exemplary graph 400 that shows exemplary primacy, recency, novelty, and valence relative to input data $X^i$ that are ordered according to timestamp data. Primacy (p) indicates a measure of the primacy effect relative to the input data. $X^i$. For example, the primacy effect relates to the notion that an object or an event experienced by a user for the first time (e.g., a first pet, a first flight trip, etc.) is remembered better than subsequent repetitions of the object or the event. Recency (r) indicates a measure of the recency effect relative to the input data $X^i$. For example, the recency effect relates to the notion that an object or an event experienced by a user more recently is remembered better than an object or an event experienced less recently. Thus, as illustrated, in relation to the recency function, when T is the most recent, the recency value is the highest, and when T is the least recent, the recency value is the lower. Conversely, as illustrated in relation to the primacy function, when T is the least recent, the primacy value may be the highest, and when T is the most recent, the primacy value may be lower. As previously stated, however, a value described in this description is exemplary. For example, depending on the contents under consideration, the primacy value of a content most recently viewed may be higher relative to a previously viewed content.

Figure 5:
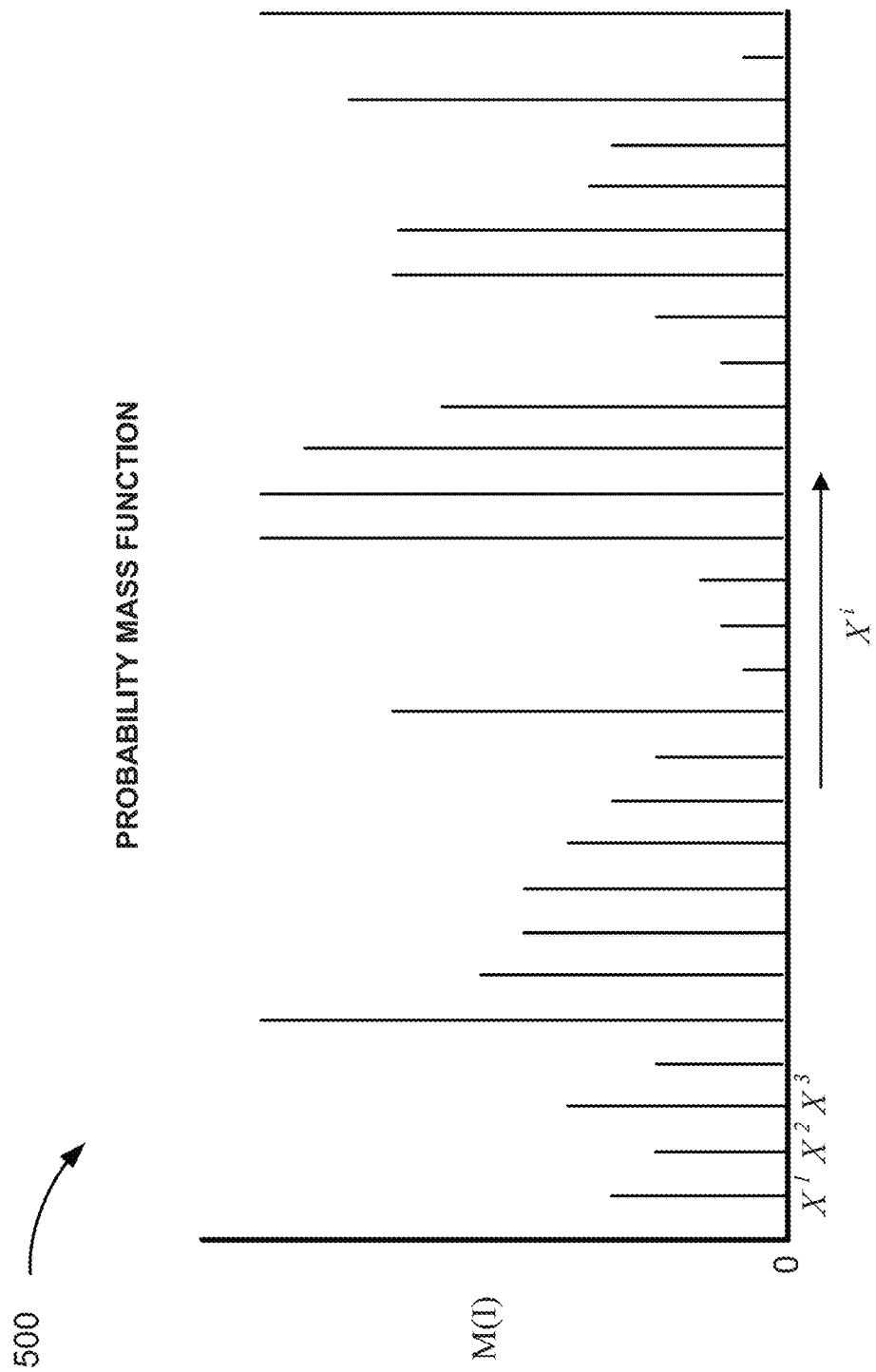
FIG. 5 is a diagram illustrating an exemplary graph that shows exemplary probability mass function values relative to input data.

Salience selector 165 includes logic that generates a new set of input data X' from the set of input data X based on the calculated effective salience value (s'), as described herein. According to an exemplary embodiment, salience selector 165 calculates a probability distribution mass value for each instance of input data X For example, salience selector 165 calculates the probability distribution mass value M(i) for each input data X(i) occurring in the output data generated by the rehearsal using the following exemplary expression:

$$M(I) = P(I = i) = \frac{S'^i}{\text{sum}(S')}, \quad (3)$$

in which $S'^i$ is the effective salience value (s') for an instance of input data $X^i$, and sum(S') is the summation of all effective salience values (s') associated with all instances of input data X. In this regard, $$\frac{S'^i}{\text{sum}(S')}$$

is a normalization of the effective salience value ($s'^i$) for each input data $X^i$. Also, with respect to expression (3), I is the random variable that indicates the cardinality of the input data X, and i is the number associated with input data X (e.g., i=1, 2, ... 100 that indicates input data $X^1$, $X^2$ ... $X^{100}$), such that a probability mass function can be generated based on the normalized effective salience associated with each input data X(i). FIG. 5 is a diagram illustrating an exemplary graph 500 that shows exemplary normalized effective salience values relative to each instance of input data $X^i$ according to a probability mass function $$M(I) = P(I = i) = \frac{S'^i}{\text{sum}(S')}.$$

Salience selector 165 includes logic that uses a probability cumulative distribution function (CDF) based on the probability mass function M associated with each input data X. For example, salience selector 165 calculates the probability cumulative distribution function value using the following exemplary expression:

$$P(I<=i) \qquad (4).$$

For example, the cumulative distribution function value is the summation of all the probabilities up to the cardinality of the instance of the input data $X^i$ (e.g., $C(I\leq 1)=P(X^1)$; $C(I\leq 2)=P(X^1)+P(X^2)$, etc.). Based on the result of the calculation, salience selector 165 generates the new set of input data X' that satisfy the probability cumulative distribution function. In this regard, for example, if the normalized effective salience $s'^1$ of $X^1$ is higher than the normalized effective salience $s'^2$ of $X^2$, then $X^1$ will occur more times in the new set of input data X' than $X^2$, and for training purposes of learning device 120, $X^1$ will be used as training data more frequently in which effective salience of the input data X is being considered. Additionally, a single input data X that has a high effective salience s' will be used as training data more frequently for similar reasons.

Salience selector 165 includes logic that generates augmented input data X" based on input data X'. According to an exemplary embodiment, salience selector 165 uses a perturbation value (e.g., –ε and +ε) that modifies an attribute value of input data X'. For example, in relation to input data X' that relates to content (e.g., a movie), the attribute value of the content may be a value associated with a type of metadata (e.g., a lead actor, a director, a year of release, etc.). In this regard, for a numerical value, the perturbation value may be ±numerical value (e.g., ±1 year or another numerical value), and for a string value (e.g., an actor's name, a director's name, etc.), the perturbation value may be a string value (e.g., Liam Neeson, Christopher Nolan, or another string value). Alternatively, salience selector 165 may omit a value associated with a type of metadata. For example, the metadata of a content (e.g., a television show) may include five supporting actors. Salience selector 165 may remove the metadata value (e.g., the fifth supporting actor's name) as a way to perturb an instance of the input data.

In this way, when there are a minimum number of instances of input data X' (e.g., below a threshold value) from which learning device 120 has available to n from training data), salience selector 165 may generate augmented input data X" to add to the input data X'. In this way, BMIDS 110 can increase the input data set and facilitate the generalized learning procedure by supplying input data X" that is very similar to input data X' in terms of having the same attribute parameter with a minor variation in the attribute value.

FIGS. 6A-H are diagrams illustrating an exemplary process of the rehearsal network service. As previously described, input data storage 150 obtains input data X and biological memory indicator data. For purposes of description, in the context of input data relating to content and metadata, an exemplary environment that provides the input data X and biological memory indicator data includes a content metadata device 601, a user profile device 602, and a biological memory indicator generator 603.

Figure 6A:
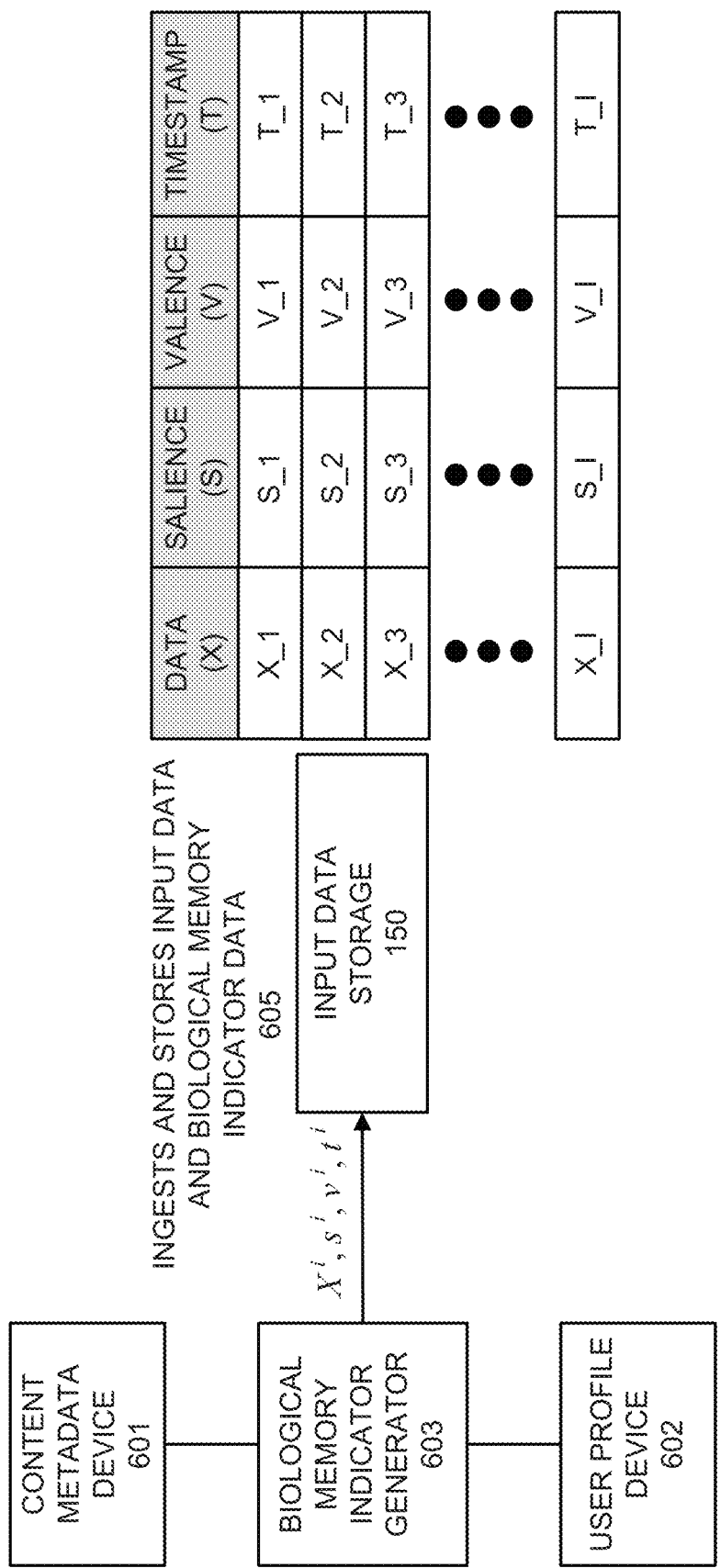
FIGS. 6A-6H are diagrams illustrating an exemplary process of the rehearsal network service.

Referring to FIG. 6A, content metadata device 601 includes a network device that stores and manages metadata of contents. According to an exemplary embodiment, the contents may be audio and visual contents, such as, for example, movies, television shows, and the like. According to other exemplary embodiments, contents may include audio content, such as, for example, music, and/or other forms of content (e.g., text, multimedia, etc.). Content metadata device 601 may be implemented to include a mass storage device. The metadata may include, for example, data indicating a title of the content, a genre and/or a sub-genre of the content, cast and crew information, storyline information, a content identifier, etc., as previously described.

User profile device 602 includes a network device that stores user profile information pertaining to users of a content service. For example, the user profile information may include historical information pertaining to the user, such as information pertaining to previous searches (e.g., search terms, selections of candidate contents in search results, and/or other forms of navigation tracking), contents viewed, when the contents are viewed (e.g., date and time), and contents considered by the user, but not viewed. According to an exemplary embodiment, the user profile information also includes ratings and review information pertaining to contents viewed. For example, the ratings and review information may include a star rating (e.g., 1-4 stars, etc.), a numerical rating (e.g., 1-4, etc.) and/or a comment/review that includes one or multiple sentences indicating the user's review, impression, dislike, like, etc., relative to the content. According to some exemplary embodiments, the content service may solicit specific information that is used as a basis to calculate salience and valence values, as described herein. For example, the user may be prompted via a graphical user interface to indicate the saliency of the content relative to other contents viewed, and an emotional impact valence) of the content viewed. Alternatively, the salience and valence values may be derived indirectly via star ratings, natural language processing, etc., as described further below.

The user profile information may also include user group information. The user group information may indicate a user group to which the user belongs based on criteria associated with the use of the content service that is in common with or similar to other users of the content service. Additionally, for example, the user profile information may include demographic information of the user, a user identifier of the user, and user preference information.

Biological memory indicator generator 603 includes a network device that generates biological memory indicator data based on the metadata of content and user profile information. For example, biological memory indicator generator 603 may generate a salience value (s) and a valence value (v) based on the ratings and review information associated with the user and the content. For example, biological memory indicator generator 603 may correlate the number of stars assigned to a content viewed by the user to a salience value (s) and a valence value (v). Additionally, for example, biological memory indicator generator 603 may include logic that uses natural language processing to elicit a salience value (s) and a valence value (v) based on words, phrases, and sentences included in the review provided by the user and pertaining to the content. Biological memory indicator generator 603 may also use feedback information (e.g., ratings, reviews, comments, etc.) from other users of the content service, a group of users of the content service to which the user belongs, and/or third parties as a basis to generate a salience value (s) and a valence value (v) According to some exemplary embodiments, when a rating and/or a review is/are not available, biological memory indicator generator 603 may generate a default salience value (s) and a default valence value (v). Biological memory indicator generator 603 uses the date and time information that indicates when the user ingested the content to generate the timestamp information (t), or when the user interacted with the content (e.g., reviewed metadata, etc.) but elected not to ingest the content.

As illustrated in FIG. 6A, according to an exemplary scenario, biological memory indicator generator 603 provides input data and biological memory indicator data to input data storage 150. Input data storage 150 ingests and stores the input data X and biological memory indicator data 605 (e.g., salience value (s), valence value (v), timestamp (t)). For example, according to this example, assume there are instances of input data X, from 1 to i, and correlated salience values (s), valence values (v), and timestamp values (t), from 1 to i.

Figure 6B:
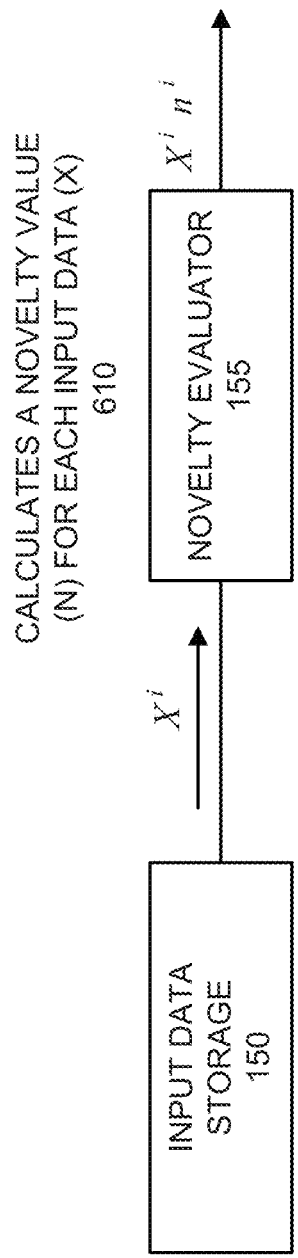

Referring to FIG. 6B, input data storage 150 provides each input data $X^i$ to novelty evaluator 155. In response, novelty evaluator 155 calculates a novelty value ($n^i$) for each input data $X^i$ 610. For example, novelty evaluator 155 calculates the novelty value ($n^i$) for each input data $X^i$ based on a one-class classifier algorithm, a distance-based model, or another other type method, such as a probabilistic method, or an information-theoretic method.

Figure 6C:
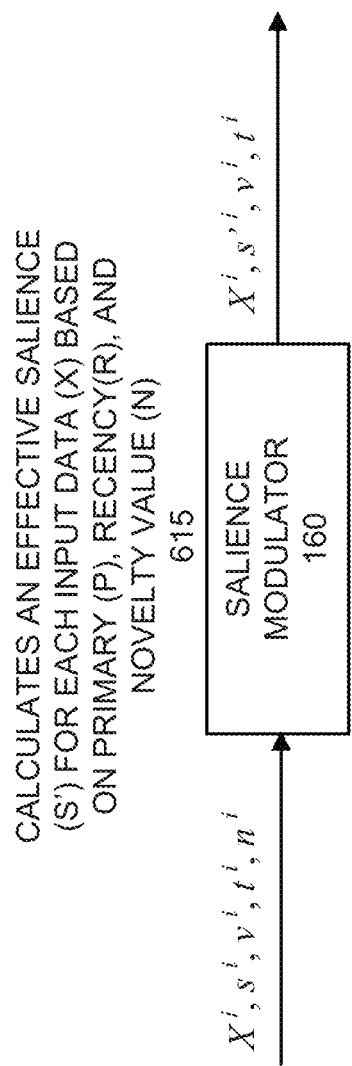

Referring to FIG. 6C, novelty evaluator 155 provides the input data, the biological memory indicator data, and the novelty value to salience modulator 160. In response to obtaining this data, salience modulator 160 calculates an effective salience value (s') for each input data $X^i$ based on primacy (p), recency (r), and novelty value (ii) 615. For example; as previously described, salience modulator 160 modulates the salience value (s) using expressions (1) and (2) in series to convolve the salience value (s). Salience modulator 160 outputs an effective salience value ($s''$) for each input data $X^i$.

Figure 6D:
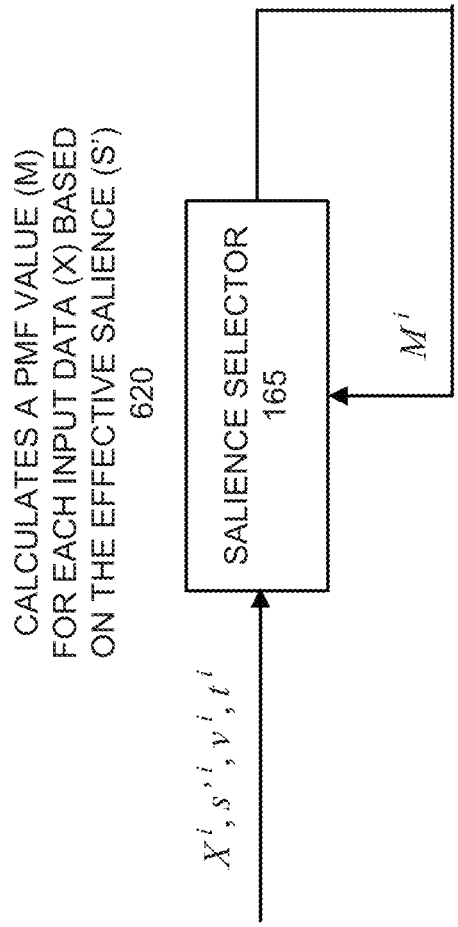
Figure 6E:
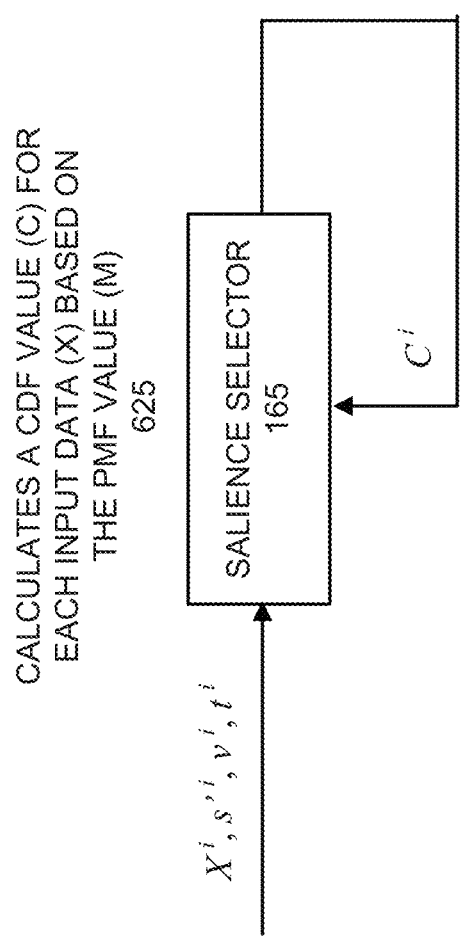
Figure 6F:
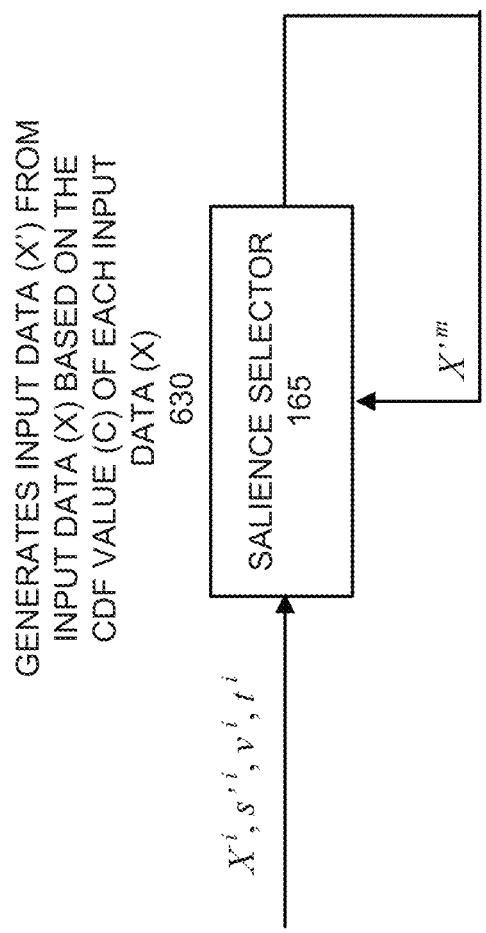

Referring to FIG. 6D, salience selector 165 receives the effective salience values (s') and calculates a PMF value ($M^i$) for each input data $X^i$ based on the effective salience value ($s''$) and expression (3). For example, salience selector 165 calculates a normalized effective salience value for each input data $X^i$, and a PMF is defined based on the normalized effective salience values. Referring to FIG. 6E, salience selector 165 calculates a CDF value ($C^i$) based on the PMF value ($M^i$) and expression (4). Referring to FIG. 6F, salience selector 165 generates input data $X'^m$ from input data $X^i$ based on the calculation resulting from expression (4). A further description of this process is described further below in relation to FIGS. 9A and 9B.

Figure 9A:
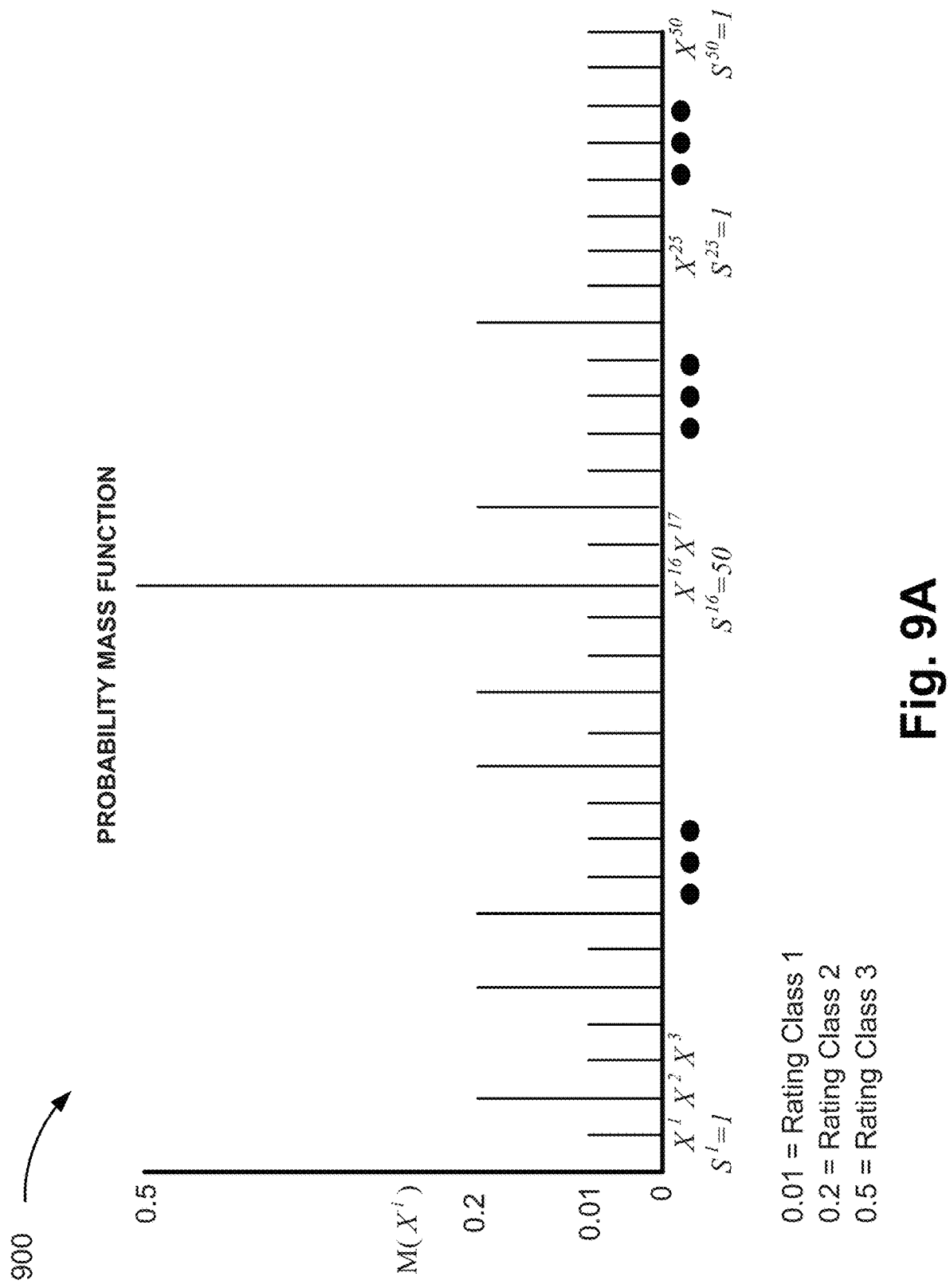
FIG. 9A is a diagram illustrating exemplary effective salience data according to an exemplary scenario.
Figure 9B:
FIG. 9B is a diagram illustrating exemplary new input data that is generated based on normalized effective salience values and probability cumulative distribution values associated with original input data.

FIG. 9A is a diagram illustrating exemplary effective salience data 900 in relation to input data $X^1$ through $X^{50}$. According to this example, as illustrated, there are three user content rating classes corresponding to effective salience values 0.01, 0.2, and 0.5. According to other examples, this may not be the case as illustrated in FIG. 5). The input data. $X^{16}$ may be considered a one-shot input example given its high effective salience value relative to the input data X. FIG. 9B is a diagram illustrating an exemplary new set of input data 950 that may be generated based on the input data $X^1$ through $X^{50}$. According to an exemplary embodiment, salience selector 165 may store a scalar. The scalar may be used to calculate the number of instances of input data for the new set of input data X'. For example, when i of $X^i$=1 to 50, salience selector 165 may multiple the scalar (e.g., s=20 or some other number) with i so as to generate 1000 instances of data (e.g., 50*20) or some other number of input data X'. Alternatively, according to another exemplary embodiment, salience selector 165 may be configured to generate a minimum number of instances of input data.

Salience selector 165 uses the cumulative distribution function values associated with each input data $X^i$ such that the number of times each input data $X^i$ is included in the new set of input data X' is proportional to the normalized effective salience value associated with the cumulative distribution function. Thus, referring to FIG. 9B, the input data $X^{16}$ is included significantly more (e.g., 50% of the 1000 input data instance in the new set X' or some other percentage) in proportion to the normalized effective salience value of $X^{16}$.

Figure 6G:
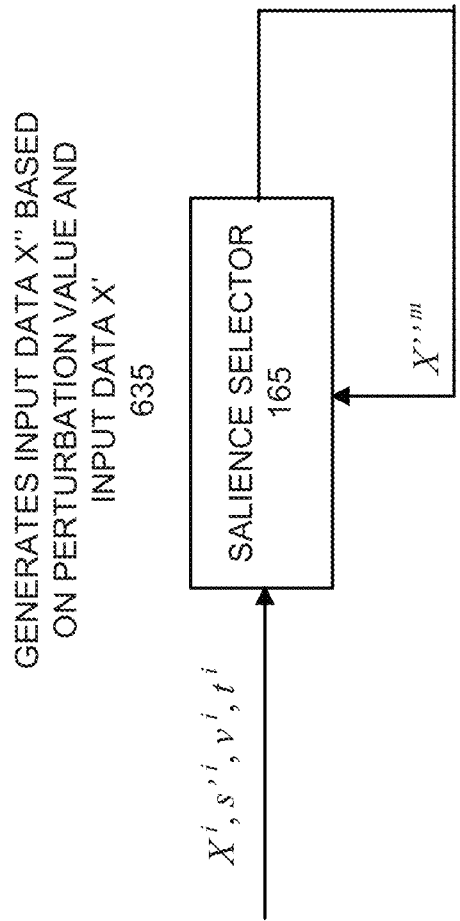

Referring to FIG. 6G, salience selector 165 generates input data $X''^m$ based on a perturbation value (e.g., $-\varepsilon$ and $+\varepsilon$) that modifies an attribute value of input data $X'^m$. Depending on the number of attributes and the values associated with the attributes, the perturbation value may be implemented as a numerical value, a string, or another type of value. For example, in relation to a computer vision application, the perturbation value may introduce cropping, color change, or other types of random variations of the original input (e.g., an image) to generate a new input (e.g., a new image). Alternatively, for example, the perturbation may be implemented as an omission of an attribute, an attribute value, or some other form of alteration relative to an instance of input data $X'^m$, In this regard, random perturbations may be applied to the input data to assist learning device 120 in the generalized learning of a user's taste or preference.

Figure 6H:
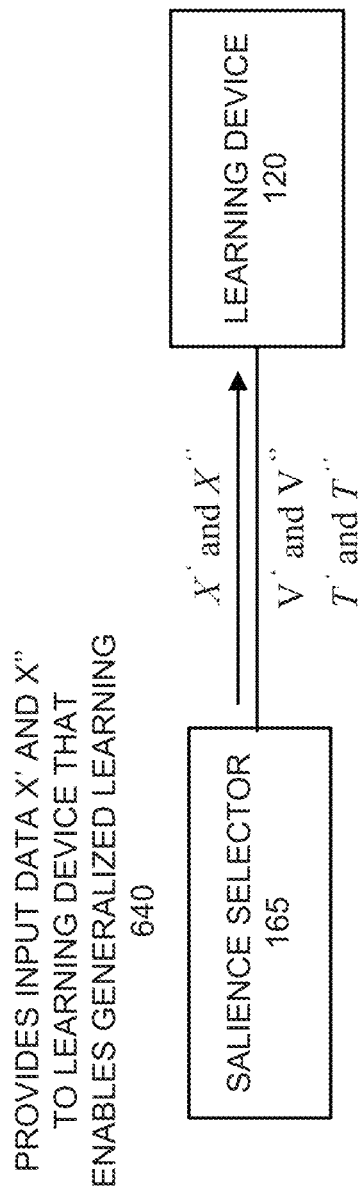

Referring to FIG. 6H, salience selector 165 provides selected input data $X'^m$ and input data $X''^m$ to learning device 120. Salience selector 165 may also provide biological memory indicator data (e.g., valence values (v), timestamp values (t), etc.) to learning device 120. Learning device 120 may use the input data $X'^m$ and input data $X''^m$ as training data in support of generalized learning, or to provide a recommendation for a user having already learned the user's taste or preference. For example, in the later case, input data X ingested and stored by input data storage 150 may relate to content that has not been previously viewed by the user to which the recommendation of contents pertains.

According to other exemplary embodiments, the process described and illustrated in FIGS. 6A-6H may include additional operations, fewer operations, and/or different operations. For example, according to other exemplary embodiments, salience selector 165 may not generate input data $X''^m$ based on a perturbation value when there are a sufficient number of input data $X'^m$. For example, salience selector 165 may compare the number of input data $X'^m$ to a threshold value, and determine whether augmented input data is to be generated based on whether the number of input data $X'^m$ satisfies the threshold value.

FIG. 7 is a diagram illustrating exemplary components of a device 700 that may be included in one or more of the devices described herein. For example, device 700 may correspond to components included in network devices of network 105, such as BMIDS 110 and learning device 120. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, application specific integrated circuits (ASICs), controllers, programmable logic devices, chipsets, graphics processing units (CPUs), field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions acid/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation or a portion of operation(s) performed by device 700, Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory, Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include drives for reading from and writing to the storage medium.

Memory/storage 715 may be external to and/or removable from device 700, such as, for example, a Universal Serial Bus (USB) memory stick, a dangle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to BMIDS 110, software 720 may include an application that, when executed by processor 710, provides the functions of the rehearsal network service, as described herein. Additionally, for example, with reference to learning device 120, software 720 may include an application that, when executed by processor 710, provides a generalized learning service. Software 720 may also include firmware, middleware, microcode, hardware description language (HDL), and/or other form of instruction. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multiplexing/de-multiplexing, filtering, amplifying, converting, error correction, etc.).

Input 730 permits an input into device 700. For example, input 730 may include a keyboard, a mouse, a display, a touchscreen, a touchless screen, a button, a switch, an input port, speech recognition logic, and/or some other type of visual, auditory, tactile, etc., input component. Output 735 permits an output from device 700. For example, output 735 may include a speaker, a display; a touchscreen, a touchless screen, a light, an output port, and/or some other type of visual, auditory, tactile, etc., output component.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.

Figure 8A:
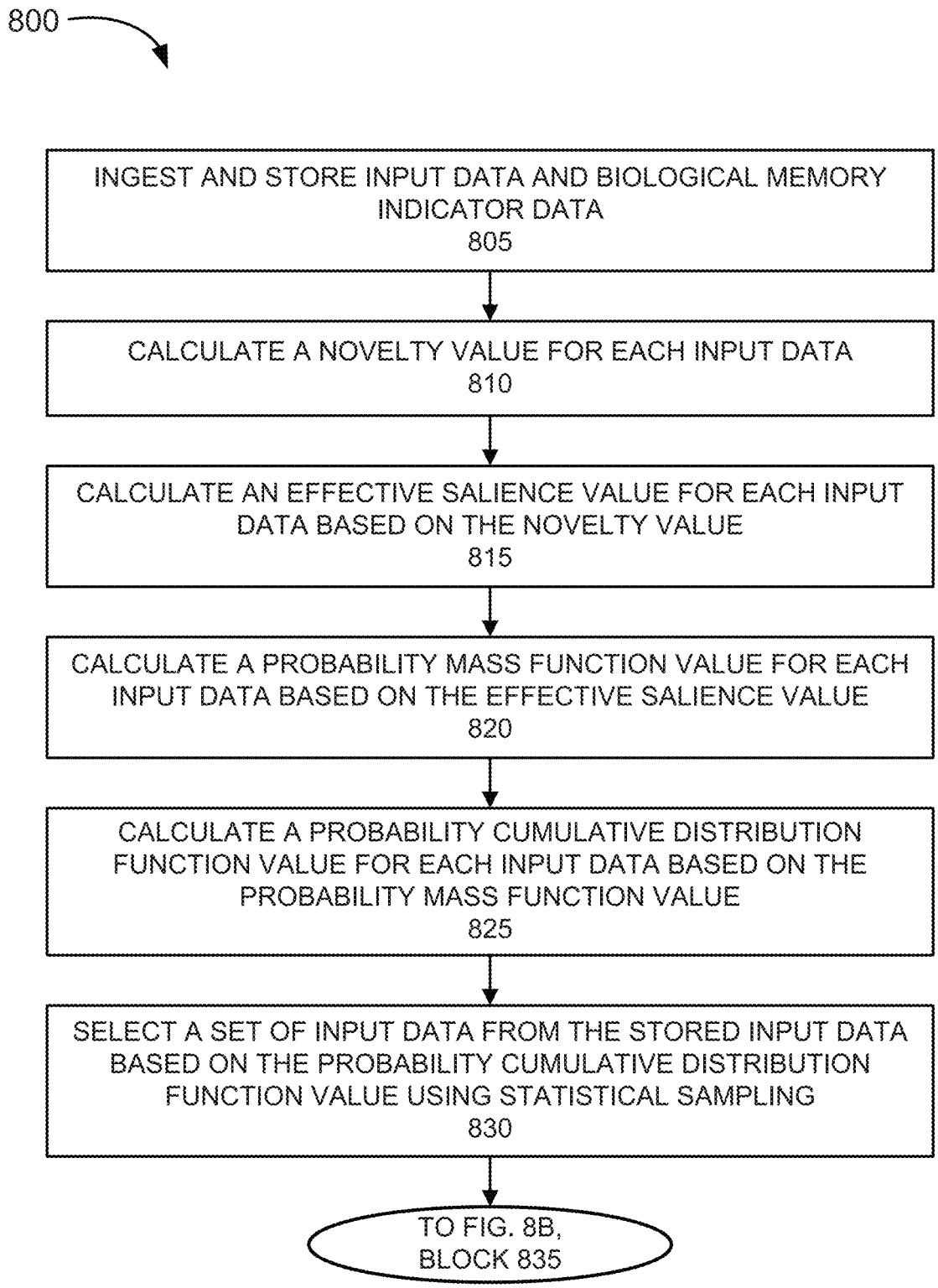
FIGS. 8A and 8B are flow diagrams illustrating an exemplary process of an exemplary embodiment of the rehearsal network service.
Figure 8B:
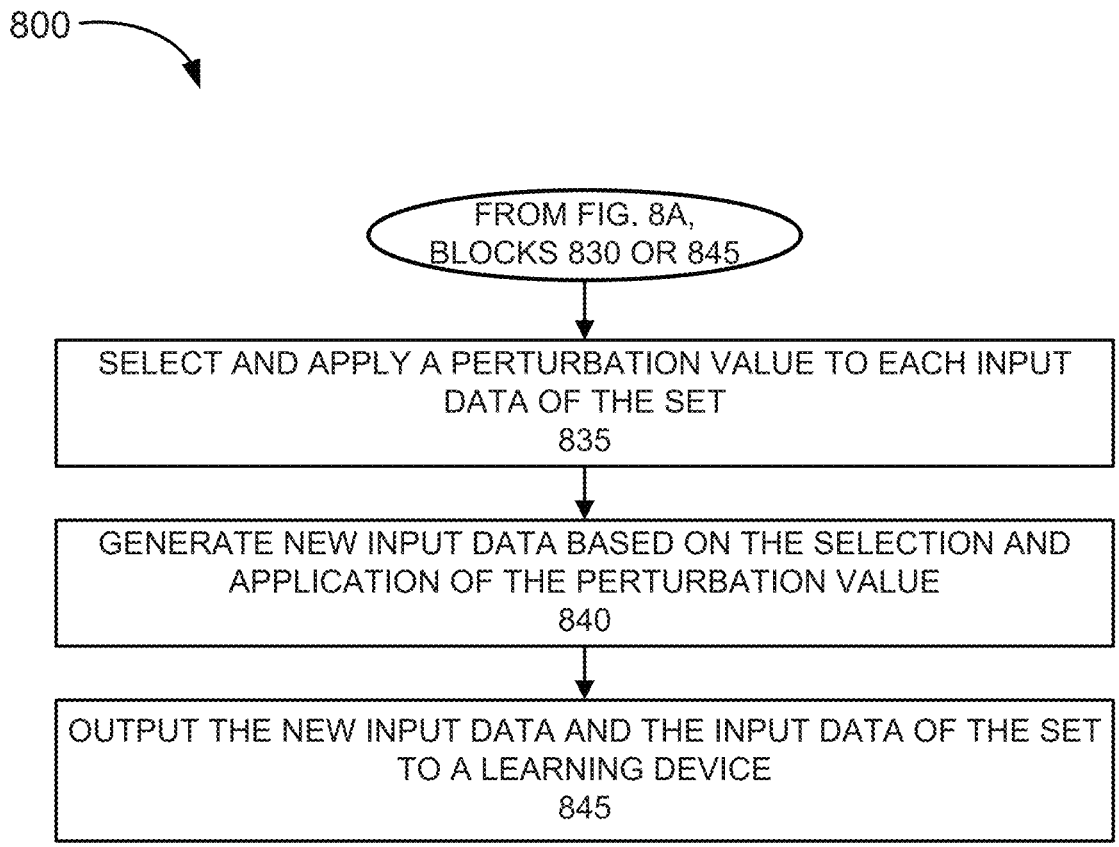

FIGS. 8A and 8B are flow diagrams illustrating an exemplary process 800 of an exemplary embodiment of the rehearsal network service. Process 800 is directed to a process previously described with respect to FIGS. 6A-6H, as well as elsewhere in this description. According to an exemplary embodiment, a network device (e.g., BMIDS 110) performs steps of process 800. For example, processor 710 executes software 720 to perform the steps illustrated in FIGS. 8A and 8B, and described herein. According to an exemplary scenario, it may be assumed that the input data relates to content that has multiple types of metadata, as previously described.

Referring to FIG. 8A, in block 805, input data and biological memory indicator data are ingested and stored. For example, BMIDS 110 receives from a network device and stores the input data and correlated biological memory indicator data pertaining to one or multiple users of a content service. The biological memory indicator data includes a salience value (s), a valence value (v), and timestamp value (t), as previously described.

In block 810, a novelty value for each input data is calculated. For example, BMIDS 110 calculates a novelty value for each input data based on a one-class classifier algorithm, a distance-based model, or another other type method, such as a probabilistic method, or an information-theoretic method.

In block 815, an effective salience value for each input data is calculated based on the novelty value. For example, BMIDS 110 calculates an effective salience value for each input data based on primacy, recency, and novelty value associated with each input data. By way of further example, BMIDS 110 uses expressions (1) and (2) to convolve the salience value (s) associated with each input data.

In block 820, a probability mass function value for each input data is calculated based on the effective salience value. For example, BMIDS 110 calculates the probability mass function value (M) for each input data based on the effective salience value (s') associated with each input data. By way of further example, BMIDS 110 uses expression (3) to calculate the probability mass function value (M).

In block 825, a probability cumulative distribution function value for each input data is calculated based on the probability mass function value. For example, BMIDS 110 calculates the probability cumulative distribution function value (C) for each input data based on the probability mass function value relating to the effective salience value (s'). In block 830, a set of input data from the stored input data is selected based on the probability cumulative distribution function value using statistical sampling. For example, BMIDS 110 selects the set of input data based on each input data and associated effective salience value (s') that satisfy expression (4).

Referring to FIG. 8B, in block 835, a perturbation value is selected and applied to each input data of the set of the input data. For example, BMIDS 110 uses the perturbation value relative to metadata values associated with the content. In block 840, new input data is generated based on the selection and the application of the perturbation value. For example, BMIDS 110 generates new input data that have modified metadata values. In block 845, the new input data and the set of the input data are output to a learning device. For example, BMIDS 110 provides the new input data and the set of the input data to learning device 110. Depending on the scenario, the new input data and the set of input data may be training data that enables generalized learning of one or multiple users taste or preference with respect to content, or candidate contents recommendation to one or multiple users, from which one or multiple candidate contents may be selected by learning device 110 for recommendation to view based on the previously learned user taste and preference.

Although FIGS. 8A and 8B illustrate an exemplary process 800 of the priming-based search and discovery service, according to other embodiments, process 800 may include additional operations, fewer operations, and/or different operations than those illustrated in FIGS. 8A and 8B, and described herein. For example, blocks 835 and 840 may be omitted when a threshold number of input data of the set are present.

As set forth in this description and illustrated by the drawings, reference is made to "an exemplary embodiment," "an embodiment," "embodiments," etc., which may include a particular feature, structure or characteristic in connection with an embodiment. However, the use of the phrase or t "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the process illustrated in FIGS. 8A and 8B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 710) of a device. A non-transitory storage medium includes one or more of the storage mediums described in relation to memory/storage 715.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
receiving, by a network device, first input data and biological memory indicator data that is correlated to the first input data, wherein the first input data includes metadata pertaining to contents, and the biological memory indicator data includes salience values indicating saliency of the first input data relative to a user, valence values indicating valence of the first input data relative to the user, and timestamp values regarding when the contents that correspond to the first input data are consumed by the user;
calculating, by the network device in response to the receiving, novelty values for the first input data, wherein the novelty values indicate novelty of the first input data relative to the user;
calculating, by the network device, effective salience values for the first input data based on the novelty values, recency values that indicate recency of the first input data relative to the user, and primacy values that indicate primacy of the first input data relative to the user;
calculating, by the network device, probability mass function values for the first input data based on normalized effective salience values;
calculating, by the network device, probability cumulative distribution function values for the first input data based on the probability mass function values and a probability cumulative distribution function;
generating, by the network device, second input data based on a statistical sampling of the first input data according to the probability cumulative distribution function values such that an inclusion of each first input data in the second input data is proportional to the normalized effective salience value of each first input data, wherein the second input data includes the metadata pertaining to the contents;
providing, by the network device to a learning device, the second input data as training data, wherein the training data enables generalized learning of taste or preference of the user by the learning device;
using, by the learning device, the second input data to train a learning model of the learning device and provide a generalized learning of the taste or the preference of the user; and
providing, by the learning device, a recommendation of a first content to the user based on the generalized learning of the learning model.

2. The method of claim 1, further comprising:
applying, by the network device, a perturbation value to the second input data, wherein the perturbation value modifies an attribute value of the metadata;
generating, by the network device based on the applying, a third input data, wherein the third input data includes the metadata having the modified attribute value pertaining to the contents; and
providing, by the network device to the learning device, the third input data as training data.

3. The method of claim 2, further comprising:
determining, by the network device, whether the second input data satisfies a threshold number of examples to train the learning device, and wherein the applying further comprises:
applying, by the network device, the perturbation value to the second input data in response to determining that the second input data does not satisfy the threshold number of examples.

4. The method of claim 2, wherein the perturbation value includes at least one of a numerical value or a string value.

5. The method of claim 1, further comprising:
calculating, by the network device, the recency values based on the timestamp values.

6. The method of claim 1, wherein the calculating of the effective salience values comprises:
convolving a recency function that includes the recency values with a primacy function that includes the primacy values, wherein the recency function and the primacy function pertain to the first input data and the user.

7. The method of claim 1, wherein the contents include at least one of movies or television shows.

8. The method of claim 1, further comprising:
calculating, by the network device, the normalized effective salience values based on the effective salience values.

9. A network device comprising:
a communication interface;
a memory, wherein the memory stores instructions; and
a processor, wherein the processor executes the instructions to:
receive, via the communication interface, first input data and biological memory indicator data that is correlated to the first input data, wherein the first input data includes metadata pertaining to contents, and the biological memory indicator data includes salience values indicating saliency of the first input data relative to a user, valence values indicating valence of the first input data relative to the user, and timestamp values regarding when the contents that correspond to the first input data are consumed by the user;
calculate, in response to the receiving, novelty values for the first input data, wherein the novelty values indicate novelty of the first input data relative to the user;
calculate effective salience values for the first input data based on the novelty values, recency values that indicate recency of the first input data relative to the user, and primacy values that indicate primacy of the first input data relative to the user;
calculate probability mass function values for the first input data based on normalized effective salience values;
calculate probability cumulative distribution function values for the first input data based on the probability mass function values and a probability cumulative distribution function;
generate second input data based on a statistical sampling of the first input data according to the probability cumulative distribution function values such that an inclusion of each first input data in the second input data is proportional to the normalized effective salience value of each first input data, wherein the second input data includes the metadata pertaining to the contents;

provide, via the communication interface to a learning device, the second input data as training data, wherein the training data enables generalized learning of taste or preference of the user by the learning device;

use the second input data to train a learning model of the learning device and provide a generalized learning of the taste or the preference of the user; and provide a recommendation of a first content to the user based on the generalized learning of the learning model.

10. The network device of claim 9, wherein the processor further executes the instructions to:

apply a perturbation value to the second input data, wherein the perturbation value modifies an attribute value of the metadata;

generate, based on the application of the perturbation value, a third input data, wherein the third input data includes the metadata having the modified attribute value pertaining to the contents; and provide, via the communication interface to the learning device, the third input data as training data.

11. The network device of claim 10, wherein the processor further executes the instructions to:

determine whether the second input data satisfies a threshold number of examples to train the learning device, and wherein when applying, the processor further executes the instructions to:

apply the perturbation value to the second input data in response to determining that the second input data does not satisfy the threshold number of examples.

12. The network device of claim 10, wherein the perturbation value includes at least one of a numerical value or a string value.

13. The network device of claim 9, wherein the processor further executes the instructions to:

calculate the recency values based on the timestamp values.

14. The network device of claim 9, wherein, when calculating the effective salience values, the processor further executes the instructions to:

convolve a recency function that includes the recency values with a primacy function that includes the primacy values, wherein the recency function and the primacy function pertain to the first input data and the user.

15. The network device of claim 9, wherein the contents include at least one of movies or television shows.

16. A non-transitory, computer-readable storage medium storing instructions executable by a processor of a device, which when executed cause the device to:

receive first input data and biological memory indicator data that is correlated to the first input data, wherein the first input data includes metadata pertaining to contents, and the biological memory indicator data includes salience values indicating saliency of the first input data relative to a user, valence values indicating valence of the first input data relative to the user, and timestamp values regarding when the contents that correspond to the first input data are consumed by the user;

calculate, in response to the receiving, novelty values for the first input data, wherein the novelty values indicate novelty of the first input data relative to the user;

calculate effective salience values for the first input data based on the novelty values, recency values that indicate recency of the first input data relative to the user, and primacy values that indicate primacy of the first input data relative to the user;

calculate probability mass function values for the first input data based on normalized effective salience values;

calculate probability cumulative distribution function values for the first input data based on the probability mass function values and a probability cumulative distribution function;

generate second input data based on a statistical sampling of the first input data according to the probability cumulative distribution function values such that an inclusion of each first input data in the second input data is proportional to the normalized effective salience value of each first input data, wherein the second input data includes the metadata pertaining to the contents;

provide to a learning device, the second input data as training data, wherein the training data enables generalized learning of taste or preference of the user by the learning device;

use the second input data to train a learning model of the learning device and provide a generalized learning of the taste or the preference of the user; and provide a recommendation of a first content to the user based on the generalized learning of the learning model.

17. The non-transitory, computer-readable storage medium of claim 16, wherein the instructions further comprise instructions executable by the processor of the device, which when executed cause the device to:

apply a perturbation value to the second input data, wherein the perturbation value modifies an attribute value of the metadata;

generate, based on the application of the perturbation value, a third input data, wherein the third input data includes the metadata having the modified attribute value pertaining to the contents; and provide, via the communication interface to the learning device, the third input data as training data.

18. The non-transitory, computer-readable storage medium of claim 17, wherein the instructions further comprise instructions executable by the processor of the device, which when executed cause the device to:

determine whether the second input data satisfies a threshold number of examples to train the learning device, and wherein the instructions to apply further comprise instructions executable by the processor of the device, which when executed cause the device to:

apply the perturbation value to the second input data in response to determining that the second input data does not satisfy the threshold number of examples.

19. The non-transitory, computer-readable storage medium of claim 16, wherein the instructions further comprise instructions executable by the processor of the device, which when executed cause the device to:

calculate the recency values based on the timestamp values.

20. The non-transitory, computer-readable storage medium of claim 16, wherein the instructions to calculate the effective salience values further comprise instructions executable by the processor of the device, which when executed cause the device to:
  convolve a recency function that includes the recency values with a primacy function that includes the primacy values, wherein the recency function and the primacy function pertain to the first input data and the user.

\* \* \* \* \*